(12) United States Patent
Ohizumi et al.

(10) Patent No.: US 6,802,619 B2
(45) Date of Patent: Oct. 12, 2004

(54) SURFACE-EMITTING DEVICE AND LIQUID CRYSTAL DISPLAY DEVICE WITH ENHANCED UTILIZATION EFFICIENCY OF LIGHT FROM LIGHT SOURCE

(75) Inventors: Mitsuo Ohizumi, Fukushima-ken (JP); Takuro Sugiura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/278,037

(22) Filed: Oct. 22, 2002

(65) Prior Publication Data

US 2003/0165054 A1 Sep. 4, 2003

(30) Foreign Application Priority Data

Oct. 23, 2001 (JP) ........................................ 2001-325419

(51) Int. Cl.[7] ................................................ F21V 7/04
(52) U.S. Cl. ............................ 362/31; 362/26; 362/330
(58) Field of Search ............................. 385/31, 39, 49, 385/88, 95, 96, 98; 362/31, 26, 27, 551, 558, 330; 349/62, 63, 65, 70, 71

(56) References Cited

U.S. PATENT DOCUMENTS 6,104,453 A 8/2000 Watanabe ..................... 349/61

FOREIGN PATENT DOCUMENTS

EP 1 113 218 4/2001

Primary Examiner—John Anthony Ward
(74) Attorney, Agent, or Firm—Brinks Hofer Gilson & Lione

(57) ABSTRACT

A front light includes a light guide panel, a light guide bar placed along an end face of the light guide panel, and light-emitting elements placed at both ends of the light guide bar. A cover member including a reflecting-surface covering portion for covering an end on the reflecting-surface side of the light guide panel, a light-guide covering portion for covering the light guide bar, and an emergent-surface covering portion for covering an end on the emergent-surface side of the light guide panel is mounted so as to cover at least the light guide bar and the ends of the light guide panel. The reflecting-surface covering portion protrudes longer in the light guide direction than the emergent-surface covering portion.

35 Claims, 7 Drawing Sheets

SURFACE-EMITTING DEVICE AND LIQUID CRYSTAL DISPLAY DEVICE WITH ENHANCED UTILIZATION EFFICIENCY OF LIGHT FROM LIGHT SOURCE

BACKGROUND OF THE INVENTION

1. Field of the Invention

The present invention relates to a surface-emitting device and a liquid crystal display device, and more particularly, to the configuration of a surface-emitting device that serves to utilize, as illumination light, more of the light emitted from a light source.

2. Description of the Related Art

Hitherto, in reflective liquid crystal display devices that produce display with ambient light used as a light source, the visibility of the display extremely decreases in an environment in which sufficient ambient light cannot be obtained, for example, when used in a dark place, because the luminance depends on the amount of ambient light. Accordingly, a liquid crystal display device has been proposed in which a front light (surface-emitting device) is placed in front of a reflective liquid crystal display unit (liquid crystal display element) so that it is used as an auxiliary light source. The liquid crystal display device having the front light operates as a normal reflective liquid crystal display device in an environment in which sufficient ambient light can be obtained, for example, outdoors in the daytime, and illuminates the front light as the light source, as necessary. An example of the configuration of such a front light will be described below with reference to FIGS. 11 to 13.

A front light 110 shown in FIG. 11 includes a flat light guide panel 112 formed by injection-molding a transparent acrylic resin or the like, and a plurality of (two in the figure) light sources 111 disposed at an end face 112a of the light guide panel 112. The lower surface of the light guide panel 112 in the figure serves as an emergent surface from which light for illuminating a liquid crystal display unit is emitted, and a surface (the upper surface of the light guide panel 112) on the opposite side of the emergent surface serves as a prism surface 112c on which projections 114 shaped like a wedge in profile are continuously arranged in parallel so as to change the direction of light propagating inside the light guide panel 112. The light sources 111 are point light sources such as white LEDs (Light Emitting Diodes) or organic EL (Electro Luminescence) elements, and are arranged so as to emit light toward the end face 112a of the light guide panel 112.

In the front light 110 having the above configuration shown in FIG. 11, light emitted from the light sources 111 is introduced into the light guide panel 112 through the end face 112a, and the light propagating therein is reflected by the prism surface 112c so as to change the propagating direction, and is emitted from the emergent surface (lower surface) of the light guide panel 112. The emitted light illuminates a liquid crystal display unit or the like placed on the back side of the front light 110.

However, since the front light 110 has a structure in which the point light sources 111 are placed at the end face 112a of the light guide panel 112, the intensity of the light introduced into the light guide panel 112 is inevitably nonuniform, and as a result, light emitted from the emergent surface is also nonuniform. Accordingly, in order to increase the uniformity of the emitted light, a front light 120 is in practical use in which a light guide bar 113 is provided between a light guide panel 112 and light sources 115, as shown in FIG. 12.

In this front light 120, as shown in FIG. 12, the light guide bar 113 is placed along an end face of the light guide panel 112, and the light sources 115 formed of an LED serving as a light-emitting element are placed at both ends in the longitudinal direction of the light guide bar 113. An outer side face (a side face on the opposite side of the light guide panel 112) 113a of the light guide bar 113 has a prismatic shape (not shown) that can reflect light propagating inside the light guide bar 113 so as to change the propagating direction.

Therefore, in the front light 120, light emitted from the light sources 115 is introduced into the light guide bar 113 through both end faces thereof, is caused by the prism surface formed on the outer side face 113a of the light guide bar 113 to change the propagating direction, and is introduced into the light guide panel 112 from the end face.

Since the front light 120 has the light guide bar 113 in this way, light is introduced from the entire connecting surface between the light guide panel 112 and the light guide bar 113 into the light guide panel 112, and this improves the uniformity of the light emitted from the emergent surface of the light guide panel 112.

While the distribution of emergent light is relatively uniform in the front light 120 having the above configuration, the luminance necessary to illuminate the liquid crystal display unit is insufficient. Furthermore, light introduced into the light guide panel 112 directly reaches the viewer from the surface (upper surface) of the light guide panel 112, and this causes a phenomenon in which the surface of the light guide panel 112 looks white (whitening), and reduces visibility. In order to solve this problem, a front light having a configuration shown in FIG. 13 has been suggested. In this front light 130, a metal cover member 118 having an angular-U profile is mounted from the side of the light guide bar 113 of the front light 130 shown in FIG. 12. This cover member 118 includes a reflecting-surface covering portion 118a placed at a reflecting surface 112c of the light guide panel 112, a light-guide covering portion 118c placed outside the light guide bar 113, and an emergent-surface covering portion 118b placed at an emergent surface (lower surface) of the light guide panel 112. These covering portions prevent light propagating inside the light guide bar 113 and the light guide panel 112 from being emitted in the directions other than the light guide direction (the direction from the light guide bar 113 toward the light guide panel 112).

In the front light 130 having such a configuration, since a decrease in luminance caused by the light loss due to the light leakage in the directions other than the light guide direction can be reduced, illumination with higher luminance than in the front light 120 shown in FIG. 12 is possible. However, since the display quality has recently been improved for higher-definition and higher-contrast liquid crystal display devices, the front lights have been required to further enhance the luminance and to further improve the uniformity of emergent light, and the development of front lights that achieve a higher-luminance and more uniform illumination has been demanded.

SUMMARY OF THE INVENTION

Accordingly, one object of the present invention is to provide a surface-emitting device that achieves high utilization efficiency of a light source, high luminance, and high uniformity of emergent light.

Another object of the present invention is to provide a liquid crystal display device having a surface-emitting device that has the above superior characteristics and achieves high visibility.

In order to achieve the above objects, according to one aspect, the present invention provides a surface-emitting device including a light guide panel, a light guide placed along an end face of the light guide panel, and light sources placed at opposing ends of the light guide, wherein a reflecting surface of the light guide panel has irregularities for reflecting light propagating therein, an emergent surface of the light guide panel emits light reflected by the reflecting surface, a cover member including at least a reflecting-surface covering portion that covers an end of the light guide panel on the side of the reflecting surface, a light-guide covering portion that covers the light guide, and an emergent-surface covering portion that covers an end of the light guide panel on the side of the emergent surface is mounted so as to cover at least the light guide and the ends of the light guide panel, and the reflecting-surface covering portion protrudes longer in the light guide direction than the emergent-surface covering portion (in other words an end of the reflecting-surface covering portion is disposed more distal to the light guide than an end of the emergent-surface covering portion).

In the surface-emitting device of this invention, more light inside the light guide panel can propagate toward the emergent surface of the light guide panel by setting the length of the reflecting-surface covering portion of the cover member that covers the light guide and the ends of the light guide panel larger than that of the emergent-surface covering portion. Since this structure can prevent light from leaking from the reflecting surface of the light guide panel, the utilization efficiency of the light sources can be enhanced, and the luminance of the surface-emitting device can be increased. Furthermore, since the light leakage toward the reflecting surface of the light guide panel is limited, whitening can be effectively reduced.

Preferably, the reflecting-surface covering portion protrudes at least 0.5 mm farther than, and more preferably, at least 0.7 mm, in the light guide direction than the emergent-surface covering portion.

Since the amount of light propagating toward the emergent surface of the light guide panel can be further increased by thus setting the difference in length, the luminance of the surface-emitting device can be increased further. The present inventor has proven in examples provided herein that the above values increase the amount of luminescence by an appreciable amount.

A reflective layer made of a metal thin film may be formed on the inner surface of the cover member. Since this structure makes it possible to reflect and return light, which is introduced from the light guide or the light guide panel into the cover member, to the light guide or the light guide panel while limiting light loss, the utilization efficiency of the light sources can be enhanced.

According to another aspect, the present invention provides a surface-emitting device including a light guide panel, a light guide placed along an end face of the light guide panel, and light sources placed at opposing ends of the light guide, wherein a reflecting surface of the light guide panel has irregularities that reflect light propagating therein, an opposing emergent surface of the light guide panel emits light reflected by the reflecting surface, a reflective film made of a metal thin film that reflects light propagating inside the light guide and the light guide panel is formed on the light guide and an end of the light guide panel, and the length of the reflective film from the end face of the light guide panel at which the light guide is placed is larger on the side of the reflecting surface of the light guide panel than on the side of the emergent surface of the light guide panel.

In order to prevent light leakage from the light guide, the light sources, or the end of the light guide panel, the reflective film made of a metal thin film is formed on the surfaces of these members. This makes it possible to prevent the above-described light leakage, to limit the amount of light lost when being reflected by the surface of the reflective film, and to thereby efficiently utilize the light from the light sources.

An antireflection layer may be formed on one or opposing of the end face of the light guide panel and a side face of the light guide facing each other. This makes it possible to prevent light from being reflected and returned toward the light guide by the end face of the light guide panel when being introduced from the light guide into the light guide panel, thereby achieving a higher-luminance surface-emitting device. That is, when light is reflected by the end face of the light guide panel, the light returned to the light guide is reflected by the reflecting surface of the light guide and enters the light guide panel again. Since such light travels in a direction that is unintended in the design of the light guide, when it is emitted from the light guide panel, the uniformity of the amount of emergent light may be decreased, and it is preferable to eliminate as much of the light as possible. The above-described structure can eliminate such reflected light.

Preferably, a side face of the light guide facing the end face of the light guide panel serves as an emergent surface for applying light from the light sources onto the light guide panel, a side face on the opposite side of the emergent surface serves as a reflecting surface on which concave grooves, each having a pair of inclined faces for reflecting light propagating inside the light guide, are periodically formed at a predetermined pitch, and the angle formed between the two inclined faces constituting the groove is within the range of 105° to 115°.

By determining the shape of the concave grooves, which have an influence on the uniformity of light emitted from the light guide, as described above, in order to improve the uniformity of light applied from the light guide onto the end face of the light guide panel, the light emitted from the light guide is efficiently supplied to the light guide panel, and the uniformity of light emitted from the light guide is improved, thereby increasing the amount of light emitted from the principal surface of the light guide panel and improving the uniformity of the light. Preferably, the depths of the concave grooves closer to the center of the light guide are larger than the depths of the concave grooves closer to the light sources. The distribution of the amount of emergent light in the longitudinal direction of the light guide is thereby made uniform.

Preferably, the angle formed between the two inclined faces constituting the concave groove is set to be within the range of 105° to 115°. Such a range makes it possible to increase the amount of light emitted toward the light guide panel, to further enhance the utilization efficiency of the light sources, and to achieve a higher-luminance surface-emitting device. When the angle is less than 105°, light is not emitted in a desired direction, and as a result, the luminance decreases. When the angle exceeds 115°, the uniformity of the amount of emergent light cannot be maintained. Opposing cases are undesirable.

Preferably, the angle formed between the two inclined faces constituting the concave groove is set to be within the range of 108° to 112°. By setting the angle within such a range, the amount of light emitted toward the light guide panel can be further increased, and the luminance of the surface-emitting device can be increased.

Preferably, the distance between the emergent surface and the reflecting surface of the light guide is set to be within the range of 3.2 mm to 5.0 mm. By setting the distance between the emergent surface and the reflecting surface within such a range, light introduced from the light guide into the light guide panel can be prevented from leaking from the principal surface of the light guide panel, and the luminance of the surface-emitting device can be thereby increased.

Preferably, the centers of light-emitting portions of the light sources are aligned with almost the center in the thickness direction of the light guide. This makes it possible to improve the uniformity of light emitted from the light guide, and the uniformity of the amount of light will not be impaired even when a large-area light guide panel is used.

According to a further aspect, the present invention provides a liquid crystal display device wherein any of the above-described surface-emitting devices is provided in front of the liquid crystal display unit. Since this allows the liquid crystal display unit to be uniformly illuminated with high luminance by the surface-emitting device, it is possible to provide a liquid crystal display device having high visibility.

Further objects, features, and advantages of the present invention will become apparent from the following description of the preferred embodiments with reference to the attached drawings.

DESCRIPTION OF THE PREFERRED EMBODIMENTS

While embodiments of the present invention will be described below with reference to the drawings, the present invention is not limited to the following embodiments.

Figure 1:
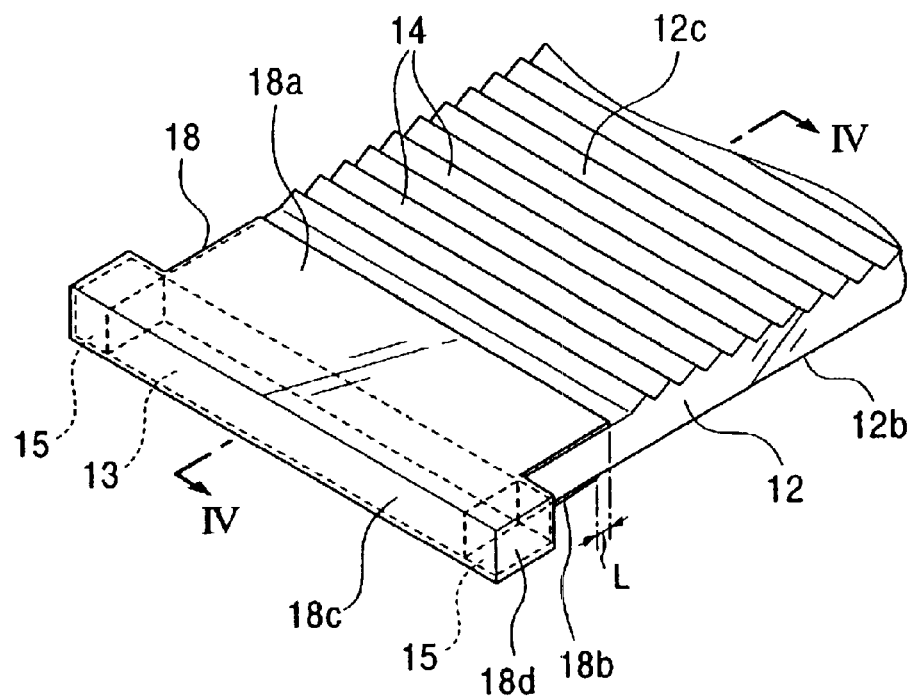
FIG. 1 is a partial perspective view of a front light according to an embodiment of the present invention.
Figure 2:
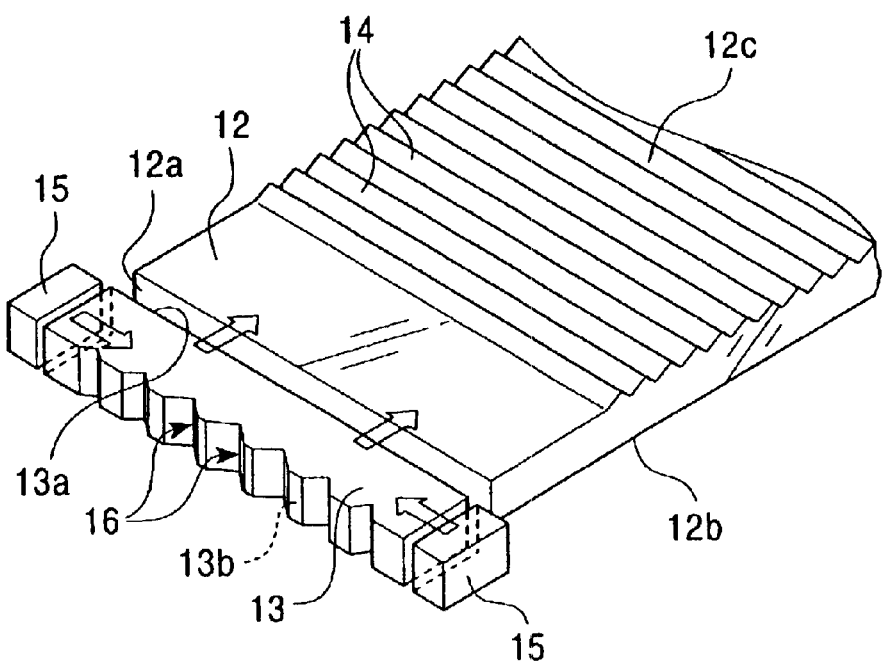
FIG. 2 is a partial perspective view of the front light shown in FIG. 1 from which a cover member is removed.

FIG. 1 is a partial perspective view of a front light (surface-emitting device) 10 according to an embodiment of the present invention. FIG. 2 is a partial perspective view of the front light 10 shown in FIG. 1 from which a cover member 18 is removed. The front light 10 shown in these figures includes a flat light guide panel 12 made of a transparent resin material, a light guide bar (light guide) 13 placed at an end on the side of an end face 12a of the light guide panel 12 (at one end on the short side of the rectangular light guide panel 12), light-emitting elements (light sources) 15 disposed at both ends in the longitudinal direction of the light guide bar 13, and a cover member 18 mounted so as to cover the light guide bar 13, the light-emitting elements 15, and the end of the light guide panel 12 on the side of the light guide bar 13.

The light guide panel 12 is a transparent flat member, as shown in FIG. 1, the end face 12a thereof facing the light guide bar 13 serves as a light incident surface, and the upper surface thereof serves as a reflecting surface 12c on which projections 14 substantially parallel to the end face 12a and having a wedge-shaped profile are formed in stripes and in parallel with one another. The light guide panel 12 reflects light introduced from the end face 12a by the reflecting surface 12c so as to change the propagating direction, and emits the light from an emergent surface 12b (the lower surface in the figure) on the opposite side of the reflecting surface 12c. The end face 12a is covered with an antireflection layer so that light from the light guide bar 13 can enter the light guide panel 12 without being reflected.

The light guide panel 12 can be produced, for example, by injection-molding a flat plate from a transparent resin material such as acrylic resin. Besides acrylic resin, transparent resin materials, such as polycarbonate resin and epoxy resin, glass, and the like may be used as the materials of the light guide panel 12. Specifically, examples of such material include ARTON (trade name: manufactured by JSR Corporation) and ZEONOR (trade name: manufactured by Zeon Corporation), but the materials are not limited to these examples.

As shown in FIGS. 1 and 2, the light guide bar 13 is a transparent member made of, for example, acrylic resin or polycarbonate resin and shaped like a quadrangular prism, and the light-emitting elements 15 formed of an LED (white LED) are placed at both ends in the longitudinal direction of the light guide bar 13. A side face of the light guide bar 13 on the opposite side of the light guide panel 12 serves as a reflecting surface 13b on which a plurality of (seven in the figure) of wedge-shaped grooves 16 are formed in stripes, as shown in FIG. 2, and the grooves 16 extend in parallel with the end faces at which the light-emitting elements 15 are provided. By reflecting light introduced from the light emitting elements 15 into the light guide bar 13 by the faces constituting the grooves 16, the propagating direction of the light is changed toward the light guide panel 12, and the light is applied onto the end face 12a of the light guide panel 12. An antireflection layer is formed on an emergent surface of the light guide bar 13 facing the end face 12a of the light guide panel 12 in order to prevent reflection at the emergent surface. Light introduced from the light guide bar 13 propagates inside the light guide panel 12, is reflected by the faces, which constitute the projections 14 formed on the reflecting surface 12c, in order to change the propagating direction, and is emitted from the emergent surface 12b.

While the light-emitting elements 15 are formed of an LED in the front light 10 of this embodiment, any light-emitting elements that can be mounted at both end of the light guide bar 13 may be used without problems, for example, ELs (Electro Luminescence) elements rather than LEDs. It is preferable that the light-emitting elements 15 be placed at the end faces of the light guide bar 13 so that the centers of the light-emitting regions thereof are aligned with almost the center in the thickness direction of the light guide bar 13. Such placement makes it possible to reduce the light that enters the side faces of the light guide bar 13 other than the reflecting surface 13b, and to improve the uniformity of the light emitted from the light guide bar 13.

The cover member 18 is a metal member having an angular-U profile that is disposed so as to cover the light guide bar 13, the light-emitting elements 15 at both ends thereof, and the end of the light guide panel 12 on the side of the light guide bar 13, as shown in FIG. 1. The cover member 18 includes a reflecting-surface covering portion 18a disposed on the reflecting-surface side (upper side in the figure) of the light guide panel 12, an emergent-surface covering portion 18b disposed on the emergent-surface side (lower side in the figure) of the light guide panel 12, and a light-guide covering portion 18c connected to the base ends of the covering portions 18a and 18b and facing the reflecting surface 13b of the light guide bar 13.

Figure 3:
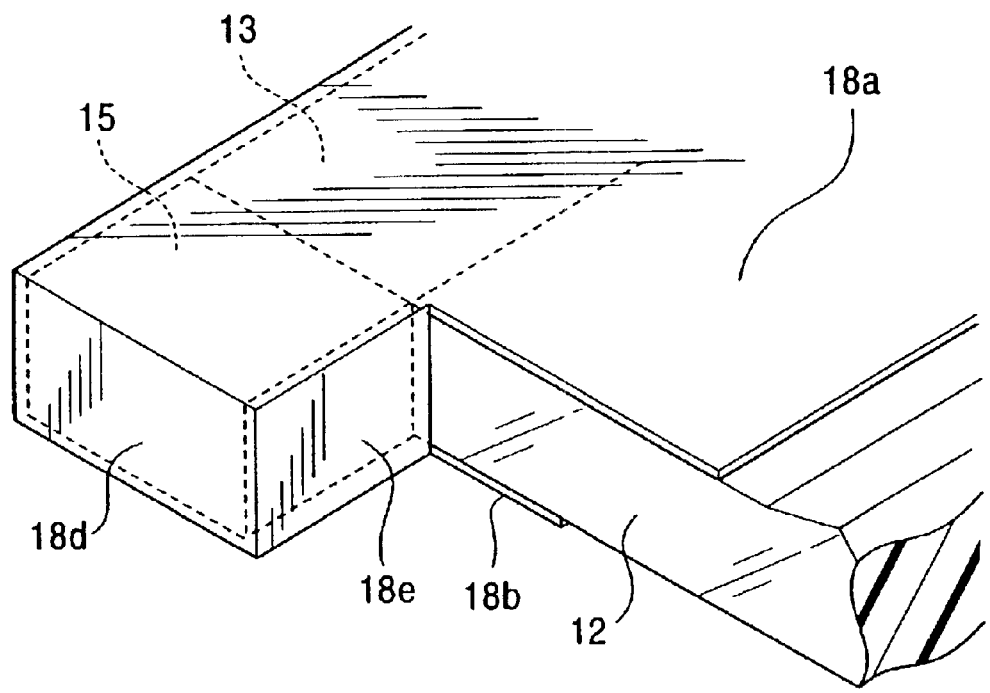
FIG. 3 is a partial enlarged perspective view of the surroundings of the cover member.

FIG. 3 is an enlarged explanatory view showing a state in which the cover member 18 of this embodiment is mounted on the light guide bar 13 and the light-emitting elements 15. As shown in this figure, in order to cover the light-emitting elements 15 protruding from the side faces of the light guide panel 12, the cover member 18 is provided with outer-face covering portions 18d facing the outer faces (faces on the opposite sides of the faces facing the light guide bar 13) of the light-emitting elements 15, and side-face covering portions 18e facing side faces of the light-emitting elements 15 on the sides of the light guide panel 12. It is preferable to minimize or more preferably, not form any gap between the outer-face covering portions 18d and the side-face covering portions 18e, and the reflecting-surface covering portion 18a, the emergent-surface covering portion 18b, and the light-guide covering portion 18c. The outer-face covering portions 18d may be omitted when the outer faces of the light-emitting elements 15 are shielded so that light does not leak out of the cover member 18.

The side-face covering portions 18e also function as mechanisms for positioning the light guide panel 12 and the light guide bar 13 in the front light 10 of this embodiment. By only being placed between the two side-face covering portions 18e, the light guide panel 12 can be precisely positioned at the side face of the light guide bar 13.

The cover member 18 of this embodiment is characterized in that the reflecting-surface covering portion 18a protrudes from the emergent-surface covering portion 18b in the light guide direction (a direction from the light guide bar 13 toward the light guide panel 12), as shown in FIG. 1, and that the length L of the protruding portion is set at 0.5 mm or more. Such a structure substantially improves the luminance of the front light 10. It is more preferable that the protrusion length L be 0.7 mm or more, and even more preferably, 0.8 mm or more. By setting the length L at such values, the luminance can be improved further. This operation will be described in detail below with reference to FIGS. 4 and 5.

Figure 4:
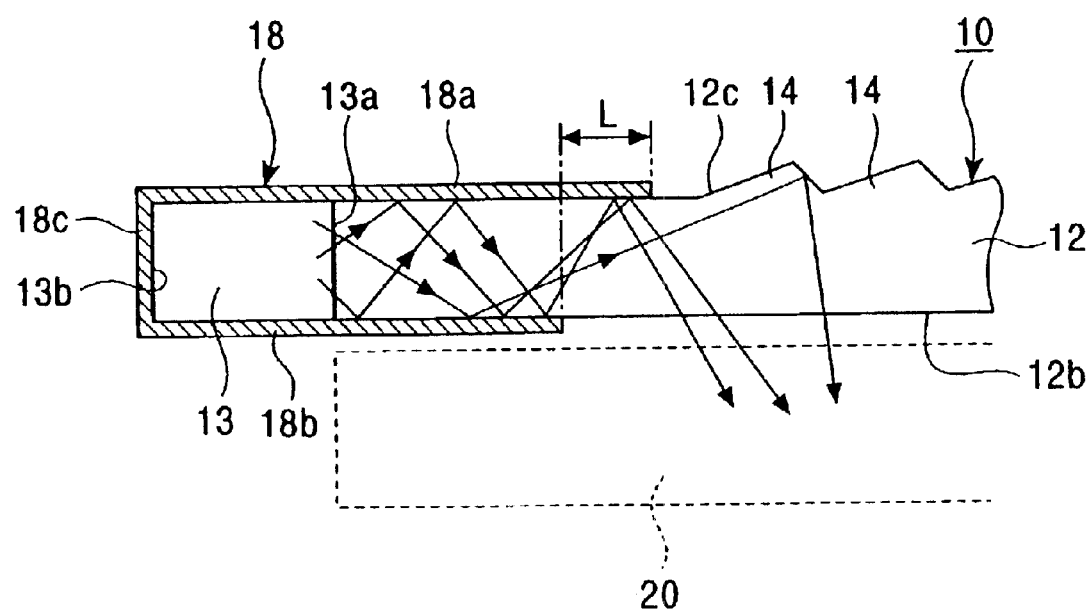
FIG. 4 is a partial sectional view of the front light, taken along line IV—IV in FIG. 1.
Figure 5:
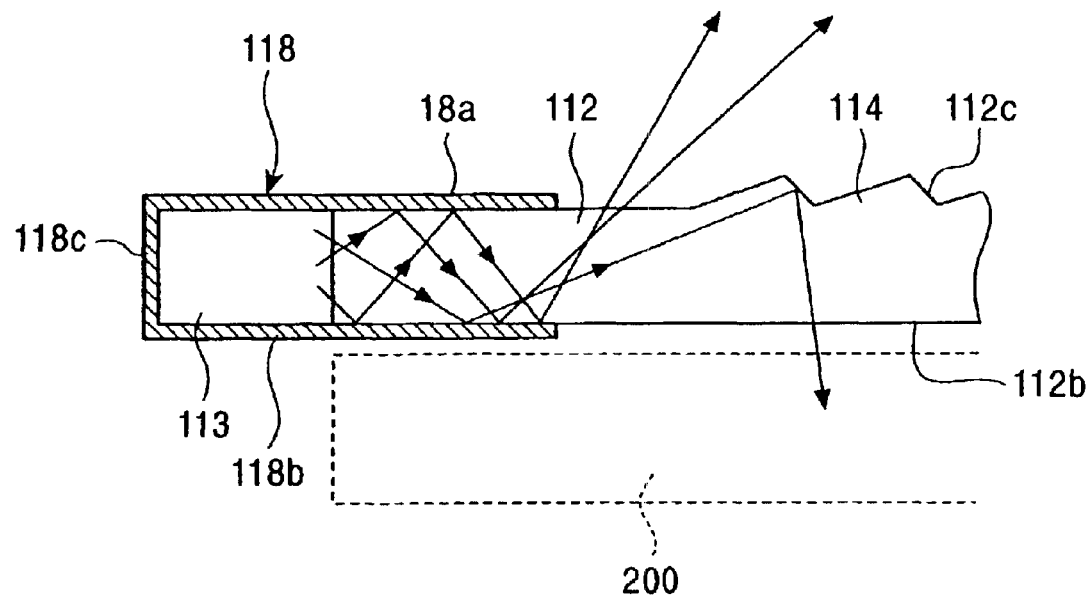
FIG. 5 is a partial sectional view of a conventional front light.
Figure 13:
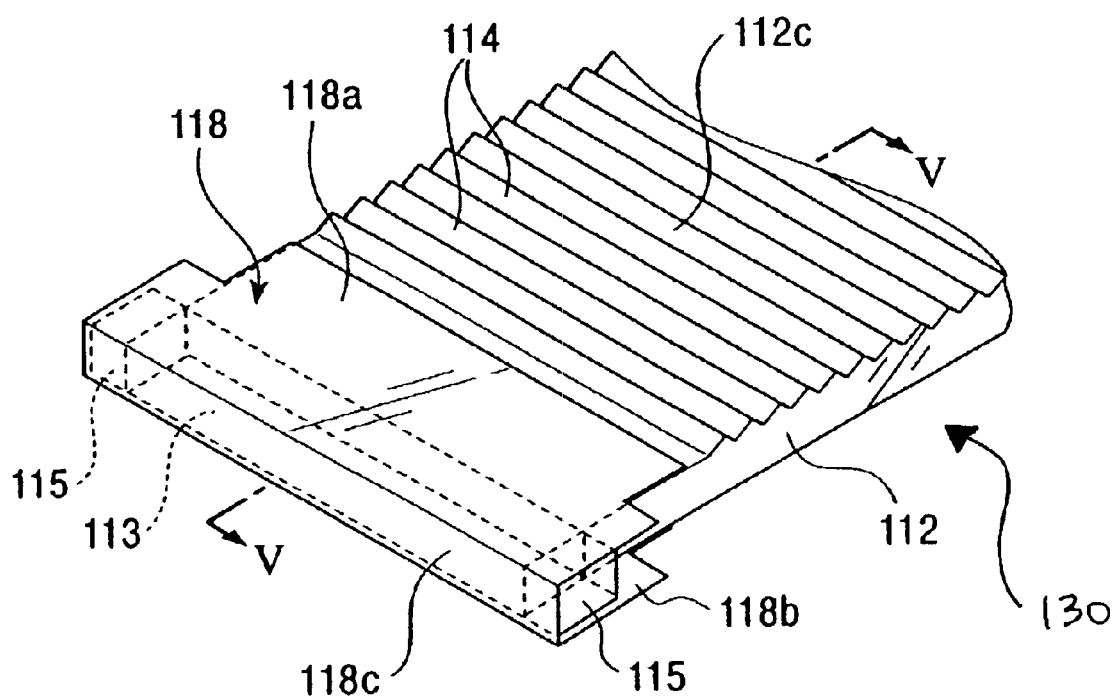
FIG. 13 is a perspective view showing a further example of a configuration of a conventional front light.

FIG. 4 is a partial sectional side view of the front light 10, taken along line IV—IV in FIG. 1, and FIG. 5 is a partial sectional side view of the front light shown in FIG. 13, taken along line V—V.

In the conventional configuration shown in FIG. 5, the cover member 118 having an angular-U profile contains the light guide bar 113 therein, and clamps the end of the light guide panel 112 from above and below, and the length in the light guide direction of the cover member 118 is substantially equal on the sides of the reflecting surface 112c and the emergent surface 112b of the light guide panel 112. In this configuration, as shown in FIG. 5, light propagating inside the light guide panel 112 and reflected by the inner surface at the leading end of the emergent-surface covering portion 118b is emitted from the reflecting surface 112c of the light guide panel 112 above the front light. When it is assumed that a liquid crystal display unit 200 is placed on the lower side of the front light, the light reaches to the user without passing through the liquid crystal display unit 20. Of course, the light does not contribute to the display of the liquid crystal display unit 200, and causes whitening in the reflecting surface 112c of the light guide panel 112, which reduces visibility.

In contrast, in the front light 10 of this embodiment shown in FIG. 4, the cover member 18 having an angular-U profile contains the light guide bar 13 therein, and clamps the light guide panel 12 in the vertical direction at its leading end. The reflecting-surface covering portion 18a on the side of the reflecting surface 12c (upper side in the figure) of the light guide panel 12 is longer by the protrusion length L in the light guide direction than the emergent-surface covering portion 18b on the side of the emergent surface 12b of the light guide panel 12. In the front light 10 having such a configuration, light emitted from the light guide bar 13 propagates from the light guide bar 13 toward the light guide panel 12 while being repeatedly reflected by the inner surface of the light guide panel 12 or the inner surface of the cover member 18. As shown in FIG. 4, of the light reflected by the inner surface of the cover member 18, light reflected by the inner surface at the leading end of the emergent-surface covering portion 18b is further reflected by the inner surface at the leading end of the reflecting-surface covering portion 18a, and is emitted below the front light 10 from the emergent surface 12b of the light guide panel 12. Therefore, for example, when a liquid crystal display unit 20 is placed on the lower side of the front light 10, as shown in FIG. 4, the light reflected by the leading end of the reflecting-surface covering portion 18a is also utilized as light that contributes to the display of the liquid crystal display unit 20. In this way, since the front light 10 of this embodiment can increase the amount of light emitted from the emergent surface 12b of the light guide panel 12 and can restrain the light from leaking from the reflecting surface 12c of the light guide panel 12, it achieves a luminance even higher than that of the conventional front light shown in FIG. 5, rarely causes whitening, and provides high visibility.

In the front light 10 of this embodiment, a reflective layer may be formed of a thin film made of a high-reflectivity metal, such as Al or Ag, on the inner side of the cover member 18 shown in FIG. 4. By forming such a reflective layer, most of the light entering the cover member 18 from the insides of the light guide bar 13 and the light guide panel 12 can be reflected to return to the light guide bar 13 and the light guide panel 12 with little attenuation. The light thus returned into the light guide bar 13 and the light guide panel 12 can be utilized as illumination light to be emitted from the emergent surface 12b of the light guide panel 12, and as a result, the luminance of the front light 10 can be enhanced.

In the front light 10 of this embodiment, the amount of emergent light is made uniform by appropriately determining the structure of the light guide bar 13. The structure of the light guide bar 13 will be described in detail below with reference to FIGS. 6 to 8.

Figure 6:
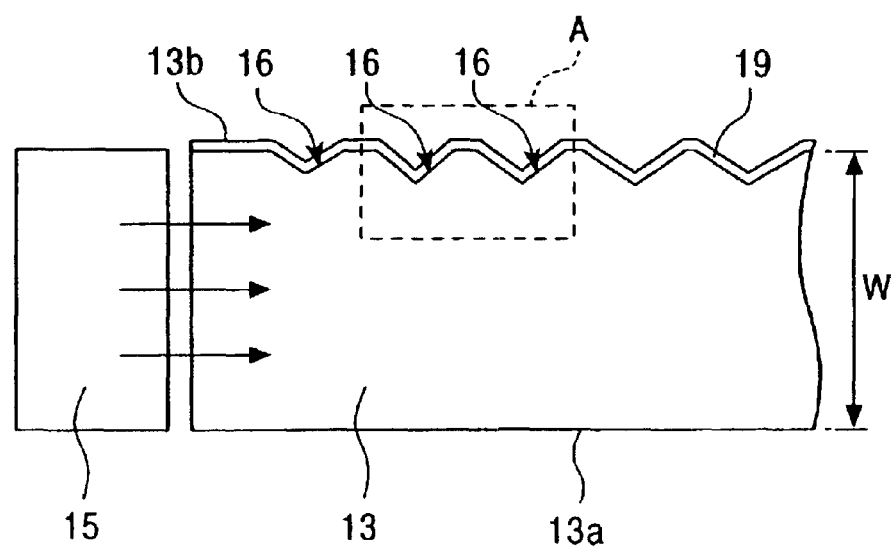
FIG. 6 is a partial plan view of a light guide bar shown in FIG. 1.
Figure 7:
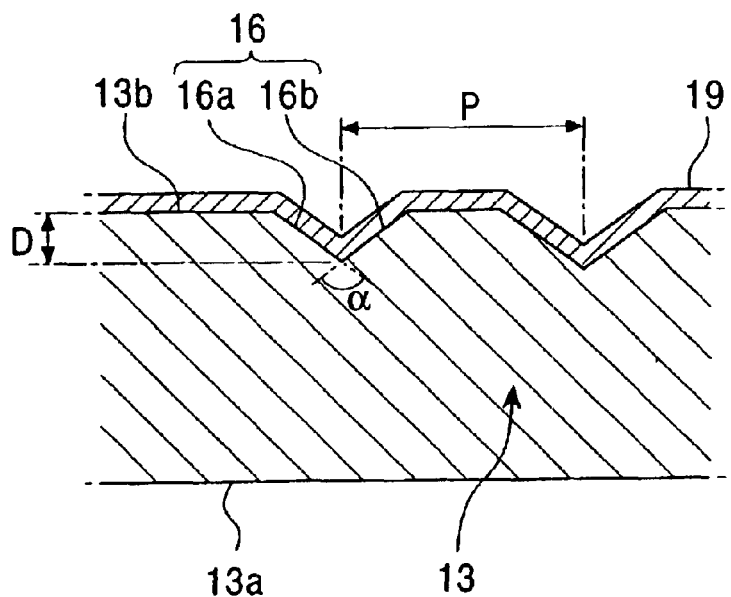
FIG. 7 is a partial enlarged plan view of a section A in FIG. 6.

FIG. 6 is a partial enlarged plan view showing the light guide bar 13 and the light-emitting element 15 shown in FIG. 2, and FIG. 7 is an enlarged structural view of a section A shown in FIG. 6.

The reflecting surface 13b of the light guide bar 13 in this embodiment is provided with a plurality of wedge-shaped grooves 16, as shown in FIG. 2, each of the grooves 16 is formed by two inclined portions 16a and 16b inclined with respect to the emergent surface 13a of the light guide bar 13, as shown in FIG. 7, and the angle α formed between the inclined portions 16a and 16b is within the range of 105° to 115°. This is because it is not preferable to set the angle α less than 105° since emergent light in a desired direction cannot be achieved and the luminance is reduced, and because it is not preferable to set the angle α more than 115° since a uniform distribution of the amount of emergent light cannot be maintained. It is more preferable to set the angle α within the range of 108° to 112°. Such a range makes it possible to further increase the amount of light emitted toward the light guide panel 12 and to further enhance the luminance of the front light 10.

As shown in FIGS. 6 and 7, a reflective layer 19 made of a high-reflectance metal thin film of Al, Ag, or the like is formed on the reflecting surface 13b of the light guide bar 13. By forming the reflective layer 19, light leakage from the reflecting surface 13b can be prevented, the light reflectance at the inclined portions 16a and 16b of the grooves 16 can be enhanced, and the amount of light emitted toward the light guide panel 12 can be increased. It is preferable that the thickness of the reflective layer 19 be within the range of 30 nm to 200 nm, and more preferably, 50 nm to 150 nm. When the thickness of the reflective layer 19 is less than 30 nm, light leaks through the reflective layer 19, and this reduces the luminance of the surface-emitting device. When the thickness exceeds 200 nm, it takes a long time to form the reflective layer 19, and this decreases the productivity and increases overall fabrication cost. Within the range of 50 nm to 150 nm, a high-reflectivity reflective layer can be easily formed, and a high-luminance surface-emitting device can be easily produced.

Figure 8:
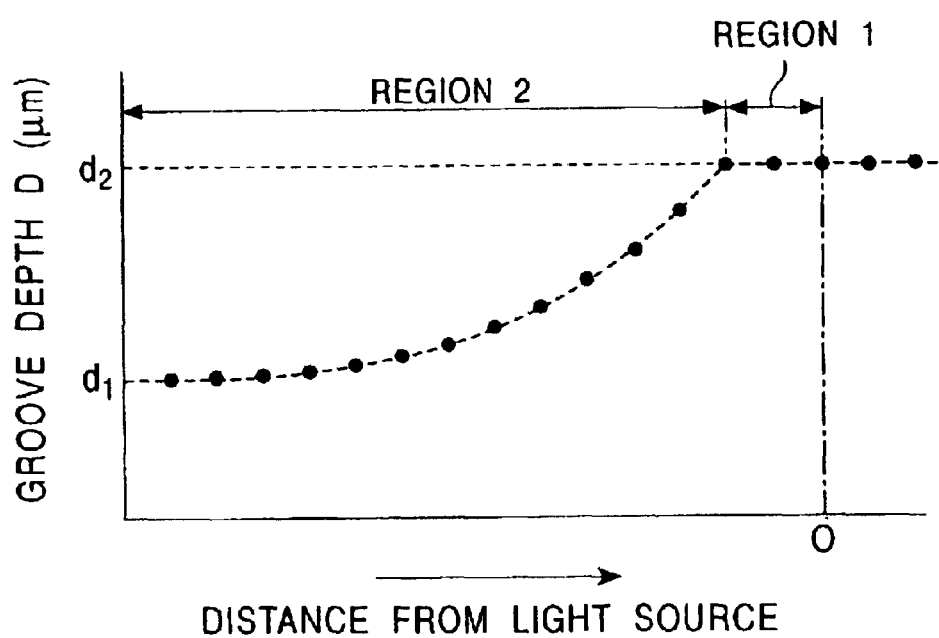
FIG. 8 is a graph showing the relationship between the depth of grooves formed on the light guide bar shown in FIGS. 1 and 2, and the distance from a light source thereto.

While the angle formed between the inclined portions 16a and 16b of the grooves 16 formed on the reflecting surface 13b in the front light 10 of this embodiment is set within the above-described range, the groove depth D shown in FIG. 7 is also controlled to be a predetermined depth. The groove pitch P is set within the range of 0.1 μm to 0.3 μm. The depth D of the grooves 16 will be described in detail below with reference to FIG. 8. FIG. 8 is a graph showing the relationship between the depth D of the grooves 16 formed on the reflecting surface 13b of the light guide bar 13 and the distance from the light-emitting element 15 to the grooves 16. While FIG. 8 shows the depths of the grooves 16 from the center of the light guide bar 13 to one light-emitting element 15, the relationship between the distance to the other light-emitting element 15 and the groove depth D is symmetrical with respect to the center of the light guide bar 13. That is, two grooves 16 at the same distance from the center of the light guide bar 13 have the same thickness D.

As shown in FIG. 8, the depths D of the grooves 16 differ between a region 1 near the center of the light guide bar 13 and a region 2 from the outer end of the region 1 to the light-emitting element 15. That is, the depths D of the grooves 16 are fixed at a depth $d_2$ in the region 1 near the center of the light guide bar 13, and the groove 16 closest to the light-emitting element 15 has a depth $d_1$ and the depth D increases toward the center of the light guide bar 13 in the region 2. The relationship between the distance from the light-emitting element 15 to the groove 16 and the depth D of the groove 16 in the region 2 is expressed by a quadratic function or an exponential function. That is, the depth D of a certain groove 16 can be expressed by a relational expression $D = at^2 + bt + d_1$ (a and b are constants) or $D = ce^t + d_1$ (c is a constant) using the distance t from the light-emitting element 15. The constants included in these relational expressions may be appropriately set to be optimum values depending on the length of the light guide bar 13 or the like.

More specifically, when the length of the light guide bar 13 is approximately 40 mm to 100 mm, the groove depth $d_1$ is set at approximately 20 μm and $d_2$ is set at approximately 50 μm in FIG. 8, and the groove depth D is gradually increased quadratically or exponentially from 20 μm in the region 2 from the light-emitting element 15 toward the center of the light guide bar 13.

It is preferable that the distance W between the reflecting surface 13b and the emergent surface 13a of the light guide bar 13 shown in FIG. 6 be within the range of 3.2 mm to 5.0 mm. When the distance W is less than 3.2 mm, the light guide bar 13 is bright at both ends, and is dark at the center. When the distance W exceeds 5.0 mm, the amount of light emitted from the front light 10 is reduced, and the luminance is reduced as a whole.

In the front light 10 of this embodiment, since the light guide bar 13 is controlled, as described above, the amount of light introduced from the light guide bar 13 into the light guide panel 12 can be increased, and the uniformity of the light is improved. This makes it possible to increase the amount of light emitted from the emergent surface of the light guide panel 12 and to enhance the uniformity of the emergent light. Furthermore, since the cover member 18 having the above-described structure is provided, light is restrained from leaking from the upper surface (reflecting surface 12c) of the light guide panel 12, and the light leaking from the upper surface in the conventional art is emitted toward the lower side of the light guide panel 12, which enhances the luminance of the front light 10.

Note that the reflector that reflects light from the light guide bar 13 through the light guide panel 12 and eventually out towards the emergent surface 12b may include either or both the cover member 18 and reflection layer 19. The reflector is merely disposed such that it extends farther from the light guide panel 12 on the reflection surface side of the light guide panel 12 than it extends on the emergent surface side of the light guide panel 12.

The reflector thus may be the cover member 18, which is a separate component that extends to about the reflection surface 12c and then terminates as shown in FIG. 4 or may be the reflection layer 19, which is fabricated on (and thus integral with) the light guide panel 12 and the light guide 13. Similarly, the reflector may include a combination of the above, for example, a cover member that covers the light guide 13 and perhaps the light sources 15 while the reflection layer 19 covers sections of the light guide panel 12. In this case, either the cover member or the reflection layer 19 may cover the section of the light guide panel 12 adjacent to the reflection surface 12c and a portion of the section of the light guide panel 12 opposing the section of the light guide panel 12 adjacent to the reflection surface 12c (these sections are shown in FIG. 4 as the ends of the light guide panel from the side end of the light guide panel 12 to the end of the cover member 18 on both sides of the light guide panel 12).

(Liquid Crystal Display Device)

Figure 9:
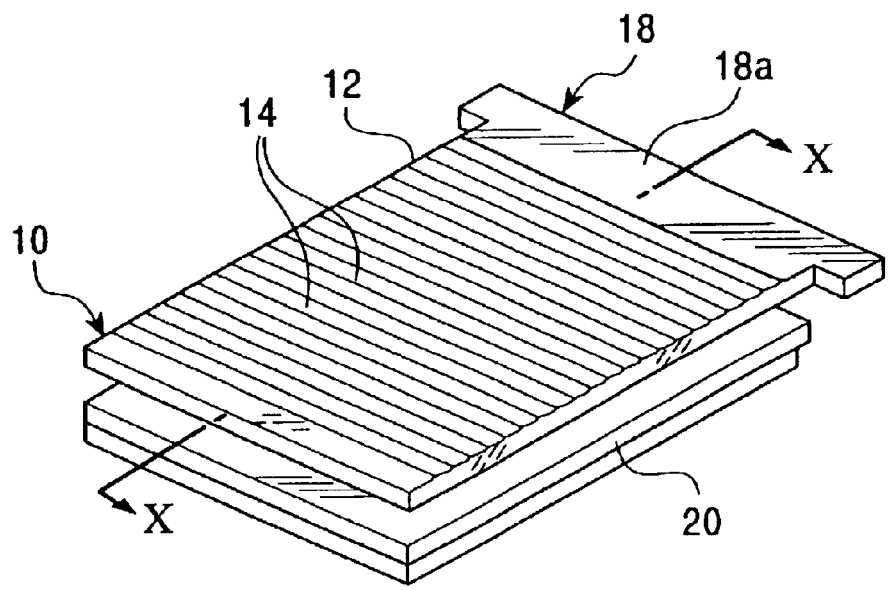
FIG. 9 is a perspective view showing an example of a liquid crystal display device having the front light of the embodiment shown in FIG. 1.
Figure 10:
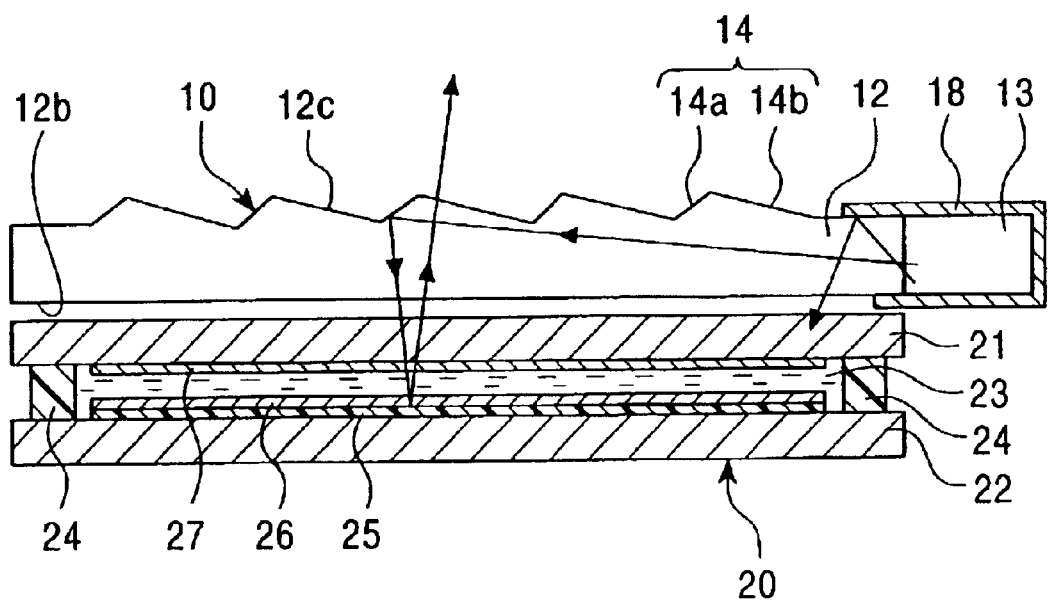
FIG. 10 is a schematic sectional view of the liquid crystal display device, taken along line X—X in FIG. 9.
Figure 11:
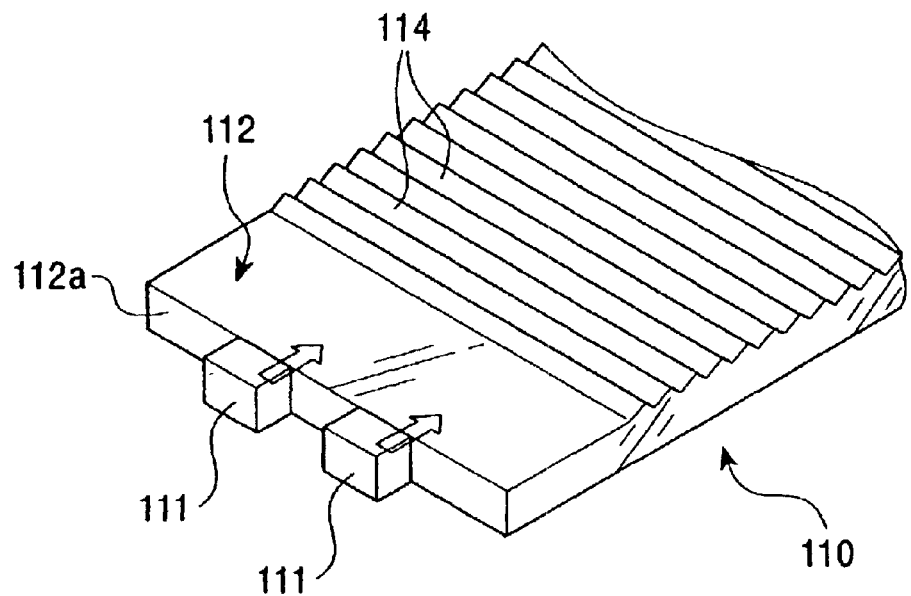
FIG. 11 is a perspective view showing an example of a configuration of a conventional front light.
Figure 12:
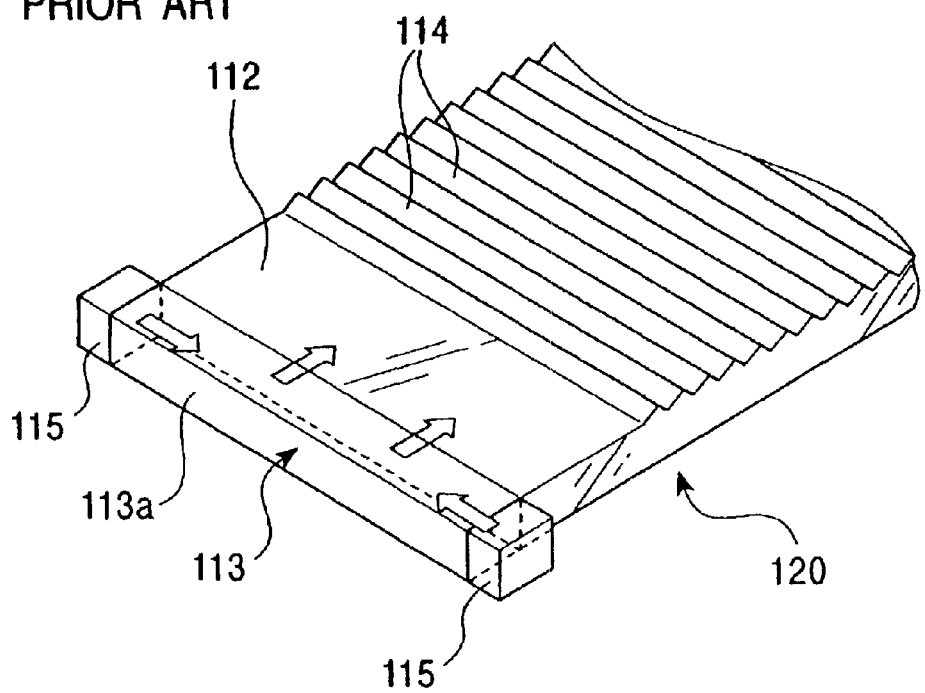
FIG. 12 is a perspective view showing another example of a configuration of a conventional front light.

A description will be given of a liquid crystal display device having the front light 10 of the above-described embodiment. FIG. 9 is a perspective view showing an example of a liquid crystal display device having the front light 10 shown in FIG. 1, and FIG. 10 is a schematic sectional view, taken along line X—X in FIG. 9. The liquid crystal display device shown in these figures roughly includes a front light 10 of this embodiment, and a liquid crystal display unit 20 placed at the back thereof.

While the configuration of the front light 10 is not described because it is similar to that of the front light 10 shown in FIG. 1, a lower surface (on the side of the liquid crystal unit 20) of a light guide panel 12 serves as an emergent surface 12b from which light is emitted, as shown in FIG. 10. A surface (upper surface of the light guide panel 12) on the opposite side of the emergent surface 12b serves as a reflecting surface 12c on which projections 14 having a wedge-shaped profile, each composed of a first inclined portion 14a inclined with respect to the emergent surface 12b so as to change the direction of light inside the light guide panel 12, and a second inclined portion 14b connected thereto, are periodically arranged.

As shown in FIG. 10, the liquid crystal display unit 20 has a structure in which a first substrate 21 and a second substrate 22 facing with a liquid crystal layer 23 therebetween are bonded and combined with a sealing member 24. On a side of the first substrate 21 close to the liquid crystal layer 23, a display circuit 27, including an electrode layer and an alignment film, for controlling the driving of the liquid crystal layer 23 is formed. On a side of the second substrate 22 close to the liquid crystal layer 23, a reflective film 25 for reflecting light entering the liquid crystal display unit 20 and a display circuit 26, including an electrode layer and an alignment film, for controlling the driving of the liquid crystal layer 23 are stacked in order. The reflective film 25 may have surface irregularities for diffusing the reflected light.

In the liquid crystal display device having the above-described configuration, light emitted from light-emitting elements 15 is first introduced into a light guide bar 13, is reflected by a reflecting surface 13b of the light guide bar 13 so as to change the propagating direction, and is introduced into the light guide panel 12 from an end face facing the emergent surface of the light guide bar 13. The light propagating inside the light guide panel 12 is reflected by the inclined portions 14a of the reflecting surface 12c of the light guide panel 12 so as to change the propagating direction, so that light for illuminating the liquid crystal display unit 20 is emitted from the emergent surface 12b of the light guide panel 12.

Next, the light entering the liquid crystal display unit 20 passes through the first substrate 21, the display circuit 27, the liquid crystal layer 23, and the display circuit 26, is reflected by the reflective film 25, and returns to the liquid crystal layer 23 again. The reflected light is emitted from the upper surface of the liquid crystal display unit 20, passes through the light guide panel 12, and reaches the user. Since the liquid crystal display device of the present invention thus uses the front light 10 of the present invention as a light source for the reflective liquid crystal display unit 20, the display thereof is visible even in a dark place in which external light is insufficient. The front light 10 of the present invention makes it possible to increase the amount of light applied to the liquid crystal display unit 20, and to thereby achieve a high-luminance display. Moreover, since light leakage toward the upper side of the front light 10 is reduced, the visibility is restrained from being reduced by whitening.

EXAMPLES

While the present invention will be described in more detail below in conjunction with the examples so as to make the advantages of the present invention more clear, it is not limited to the following examples.

In these examples, front lights in which the protrusion length L of a cover member 18 on the upper side of a light guide panel 12 varied were produced on the basis of the front light 10 shown in FIG. 1. The features of these front lights are shown in Table 1. In the front lights produced in these examples, a white LED was used as a light-emitting element 15, and the light guide panel 12 was formed of a flat panel of 50 mm×40 mm×0.7 mm molded from acrylic resin. Regarding the depths of grooves 16 formed on a reflecting surface 13b of a light guide bar 13, the depth of a groove closest to the light-emitting element 15 was set at 20 μm, and the thicknesses of grooves 16 at a distance of 3 mm or less from the center of the light guide bar 13 were fixed at 50 μm. The depth of the groove 16 was exponentially increased from the light-emitting element 15 toward the center of the light guide bar 13.

TABLE 1

| | Protrusion Length L of Cover Member (mm) | Luminance Characteristics | |
|---|---|---|---|
| | | Luminance (cd/m$^2$) | Luminance Nonuniformity (%) |
| Sample 1 | 0.5 | 30.0 | 55 |
| Sample 2 | 0.6 | 30.5 | 50 |
| Sample 3 | 0.7 | 31.0 | 45 |
| Sample 4 | 0.8 | 31.5 | 43 |
| Sample 5 | 0.9 | 32.0 | 40 |
| Comparative Example 1 | 0 | 26.0 | 58 |

Next, the above produced front lights were operated, and the amount of emergent light (that is, the display luminance of the liquid crystal display device) and the distribution thereof obtained, when light emitted from the emergent surface (lower surface in the figure) of the light guide panel 12 entered the liquid crystal display unit 20, was reflected by the reflective film 25, and reached the user, were measured. The measurements were carried out with Luminance Colorimeter BM5A (trade name: manufactured by Topcon Corporation). The measurement results are also shown in Table 1.

As shown in Table 1, the luminance was substantially enhanced in the front lights of Samples 1 to 5 in which the shapes of the light guide bars 13 satisfied the requirements of the present invention, compared with a front light of Comparative Example in which the shape of the light guide bar 13 did not satisfy the requirements of the present invention. Moreover, variations in luminance are reduced. This reveals that the front lights can achieve a high-luminance and uniform illumination.

What is claimed is:

1. A surface-emitting device comprising:

a light guide panel having a reflecting surface containing irregularities that reflect light propagating therein and an emergent surface that emits light reflected by the reflecting surface;

a light guide placed along an end face of the light guide panel;

light sources placed at opposing ends of the light guide; and a cover member including a reflecting-surface covering portion that covers an end of the light guide panel on the side of the reflecting surface, a light-guide covering portion said that covers the light guide, and an emergent-surface covering portion that covers an end of the light guide panel on the side of the emergent surface, and wherein an end of the reflecting-surface covering portion is disposed more distal to the light guide than an end of the emergent-surface covering portion.

2. A surface-emitting device according to claim 1, wherein the end of the reflecting-surface covering portion is at least 0.5 mm more distal from the light guide than the end of the emergent-surface covering portion.

3. A surface-emitting device according to claim 2, wherein the end of the reflecting-surface covering portion is at least 0.8 mm more distal from than the end of the emergent-surface covering portion.

4. A surface-emitting device according to claim 1, wherein a reflective layer made of a metal thin film is formed on an inner surface of the cover member.

5. A surface-emitting device comprising:
a light guide panel;
a light guide placed along an end face of the light guide panel, the light guide containing a reflecting surface having irregularities that reflect light propagating therein and an opposing emergent surface that emits light reflected by the reflecting surface;
a reflective film that reflects light propagating inside the light guide and the light guide panel formed on the light guide and an end of the light guide panel; and
light sources placed at opposing ends of the light guide,
wherein a length of the reflective film from the end face of the light guide panel at which the light guide is placed is larger on a side of the reflecting surface of the light guide panel than on a side of the emergent surface of the light guide panel.

6. A surface-emitting device according to claim 1, wherein an antireflection layer is formed on one of the end face of the light guide panel and a side face of the light guide facing the end face.

7. A surface-emitting device according to claim 1, wherein a side face of the light guide facing the end face of the light guide panel is an emergent surface through which light from the light sources is supplied to the light guide panel, and a side face on an opposite side of the emergent surface is a reflecting surface on which concave grooves, each having a pair of inclined faces that reflect light propagating inside the light guide, are periodically formed at a predetermined pitch, and wherein depths of the concave grooves closer to a center of the light guide are larger than depths of the concave grooves closer to the light sources, and an angle formed between the two inclined faces constituting each of the grooves is within a range of 105° to 115°.

8. A surface-emitting device according to claim 7, wherein the angle formed between the two inclined faces constituting each of the concave grooves is within a range of 108° to 112°.

9. A surface-emitting device according to claim 7, wherein the concave grooves are formed at a pitch within a range of 0.1 μm to 0.3 μm.

10. A surface-emitting device according to claim 1, wherein a distance between the emergent surface and the reflecting surface of the light guide is within a range of 3.2 mm to 5.0 mm.

11. A surface-emitting device according to claim 1, wherein centers of light-emitting portions of the light sources are aligned with almost a center in a thickness direction of the light guide.

12. A liquid crystal display device wherein a surface-emitting device according to claim 1 is provided in front of a liquid crystal display unit.

13. A surface-emitting device according to claim 5, wherein the light guide panel has a reflecting surface containing irregularities that reflect light propagating therein and an emergent surface that emits light reflected by the reflecting surface.

14. A surface-emitting device according to claim 5, further comprising an antireflection layer formed on one of the end face of the light guide panel and a side face of the light guide facing the end face of the light guide panel.

15. A surface-emitting device according to claim 13, wherein the irregularities on the reflecting surface of the light guide panel are concave grooves periodically formed at a predetermined pitch, each concave groove having a pair of inclined faces that reflect light propagating inside the light guide, depths of the concave grooves closer to a center of the light guide are larger than depths of the concave grooves closer to the light sources, and an angle formed between the two inclined faces constituting each of the grooves is within a range of 105° to 115°.

16. A surface-emitting device according to claim 15, wherein the concave grooves are formed at a pitch within a range of 0.1 μm to 0.3 μm.

17. A surface-emitting device according to claim 15, wherein a distance between the emergent surface and the reflecting surface of the light guide is within a range of 3.2 mm to 5.0 mm.

18. A surface-emitting device according to claim 5, wherein centers of light-emitting portions of the light sources are aligned with almost a center in a thickness direction of the light guide.

19. A liquid crystal display device wherein a surface-emitting device according to claim 5 is provided in front of a liquid crystal display unit.

20. A method of increasing luminescence of a surface-emitting device, the method comprising:
placing a light guide along an end face of a light guide panel having a reflecting side including a reflecting surface containing irregularities that reflect light propagating therein and an emergent surface that emits light reflected by the reflecting surface;
placing light sources at opposing ends of the light guide; and
introducing a light reflector to the light guide panel, the light reflector reflecting light from the light sources and impinging on the reflecting side toward the emergent surface, the light reflector covering a first section of the reflecting side adjacent to the reflecting surface and a second section of the emergent surface opposing a portion of the first section, the first section larger than the second section.

21. The method of claim 20 further comprising introducing the light reflector such that the light reflector extends continuously along the reflecting side.

22. The method of claim 20, further comprising introducing the light reflector such that the light reflector covers at least a portion of the light guide.

23. The method of claim 22, further comprising introducing the light reflector such that the light reflector covers the light sources.

24. The method of claim 20, further comprising forming irregularities on a reflecting surface of the light guide, the irregularities reflecting light propagating therein towards the light guide panel.

25. The method of claim 20, further comprising coating one of an end face of the light guide panel and a side face of the light guide facing the end face of the light guide panel with an antireflection layer.

26. The method of claim 20, further comprising limiting an angle formed between inclined faces constituting periodic concave grooves that form the irregularities to be within a range of 105° to 115° and limiting depths of the grooves closer to a center of the light guide to be larger than depths of the concave grooves closer to the light sources.

27. The method of claim 20, further comprising limiting a pitch of the concave grooves to be within a range of 0.1 µm to 0.3 µm.

28. The method of claim 20, further comprising limiting a distance between the emergent surface and the reflecting surface of the light guide to be within a range of 3.2 mm to 5.0 mm.

29. The method of claim 20, further comprising aligning centers of light-emitting portions of the light sources with almost a center in a thickness direction of the light guide.

30. The method of claim 20, further comprising providing the surface-emitting device of claim 20 in front of a liquid crystal display unit.

31. A surface-emitting device comprising:
   a light guide panel having a reflecting surface containing irregularities that reflect light propagating therein and an emergent surface that emits light reflected by the reflecting surface; and
   a light guide placed along an end face of the light guide panel having a reflecting surface containing irregularities that reflect light propagating therein and an emergent surface that emits light reflected by the reflecting surface towards the light guide panel; and
   an antireflection layer on one of an outer emergent surface of the light guide and an outer surface end face of the light guide panel opposing the emergent surface of the light guide.

32. The surface-emitting device of claim 31, further comprising light sources placed at opposing ends of the light guide.

33. The surface-emitting device of claim 31, further comprising a light reflector that permits substantially no light to be emitted from a first section of the light guide panel adjacent to irregularities of the light guide panel.

34. A surface-emitting device comprising:
   a light guide panel having a reflecting surface containing irregularities that reflect light propagating therein and an emergent surface that emits light reflected by the reflecting surface; and
   a light guide placed along an end face of the light guide panel having a reflecting surface containing irregularities that reflect light propagating therein and an emergent surface that emits light reflected by the reflecting surface towards the light guide panel,
   wherein the light reflector has an upper surface that is disposed on the first section and a lower surface that is disposed on a second section of the light guide panel opposing the first section, the light that is not emitted from the first section is reflected by the second section.

35. The surface-emitting device of claim 34, wherein the first section extends further from the light guide than the second section.

* * * * *